June 29, 1971 — I. COOPER ET AL — 3,589,914
CRISP, BACON FLAVORED CHIPS AND FOODS CONTAINING THEM
Filed Feb. 16, 1967

CHIPS

DOUGH

Inventors:—
Irwin Cooper,
Daniel Melnick
By Frank E. Robbins and
Janet E. Price
Attys.

United States Patent Office 3,589,914
Patented June 29, 1971

3,589,914
CRISP, BACON FLAVORED CHIPS AND FOODS CONTAINING THEM
Irwin Cooper, Staten Island, N.Y., and Daniel Melnick, West Englewood, N.J., assignors to CPC International Inc.
Continuation-in-part of application Ser. No. 580,036, Sept. 16, 1966. This application Feb. 16, 1967, Ser. No. 616,617
Int. Cl. A23l *1/10*
U.S. Cl. 99—83         7 Claims

ABSTRACT OF THE DISCLOSURE

Edible, crisp chips are flavored and colored to simulate bacon, and may be in the form of flakes or strips. They are made from a flour-based dough and may be incorporated into other foods such as peanut butter.

---

This application is a continuation-in-part of U.S. Ser. No. 580,036, filed Sept. 16, 1966, now abandoned.

This invention relates to crisp, flavored food chips and methods for making them. More particularly, the invention relates to edible, crisp, bacon-like flavored chips, preferably being reddish-brown in color or being colored so as to simulate fried bacon chips or strips, that have attractive taste and texture, that are attractive snack items in their own right, and that are also useful as flavoring additives.

There is available today no stable form of fried bacon which has an acceptable flavor-life both on the grocer's shelf and in repetitive home use in the absence of refrigeration. Such a product would have immense appeal to the housewife. In addition, marketable combinations of bacon in foods are not found in any significant numbers when such foods are displayed without benefit of refrigeration. For example, the attraction of sandwiches and snacks made of a combination of peanut butter and fried bacon, or bits of fried bacon, has long been recognized. This combination, while popular, is available only by custom preparation at the time of consumption. Commercial preparations of peanut butter and bacon or of bacon bits have not become popular, either because of preservation problems, or because of the relative expense of the combination.

Recently, textured meat analogs, made from soy proteins, have become available on a commercial scale. These meat analogs simulate the lean portion of fried, crumbled, smoke-cured bacon. They are sold for direct consumption as snack items, and also for incorporation in other foods to enhance their appeal. They make a particularly attractive combination with peanut butter.

These textured meat analogs are specially tailored from spun soy proteins that are spinneret-extruded into monofilaments. These spun monofibrils are blended with other ingredients, such as, for example, fats, egg solids, sugar, and the like, and also with binders, flavors, and colors. They are then cooked in order to heat-set them, and are dried. They are then ready for use and consumption.

The available processes for preparing such articles are not entirely satisfactory. One primary disadvantage is that the known processes tend to result in the production of fibers and filaments that are not uniform. Some of the fibers produced have undesirable odors and flavors, probably caused by degradation of the protein material. Another problem caused by degradation of the protein material is the loss of a substantial portion of the spinning solution during production, for example, where mechanical failure in the equipment prevents use of the solution within the prescribed time period after preparation. In addition to these difficulties, the process is an expensive one.

One object of the present invention is to provid crisp, flavored food chips that simulate the lean portion of fried, crumbled, smoke-cured bacon, of a new type, that can be produced by new, practical, production techniques, and, as well, to provide such techniques for their production.

Another object of the invention is to provide new, practical processes for the production of edible, crisp, bacon-like flavored chips of different sizes, that are relatively less expensive than comparable products based upon spun soy proteins, that are easier to manufacture, that are more uniform as to texture, quality, and flavor, that have strong taste appeal, and that have good mouthing characteristics. A related object of the invention is to provide practical processes for producing such chips.

A further object of the invention is to provide edible, crisp, bacon-like flavored chips for incorporation into peanut butter, and that have relatively low bulk density but very high, strong flavor and taste appeal, and that are thereby particularly useful for admixture with peanut butter and peanut butter products. A related object of the invention is to provide new and practical processes for producing such chips.

Another object of the present invention is to provide crisp flavored elongated food chips that simulate whole fried bacon strips in flavor, texture and appearance, said chips being of a new type, that can be produced by new, practical production techniques, and, as well, to provide such techniques for their production.

Other objects of the invention will be apparent hereafter from the specification and from the recital of the appended claims.

Figure 4:
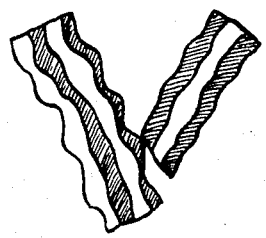
Figure 3:
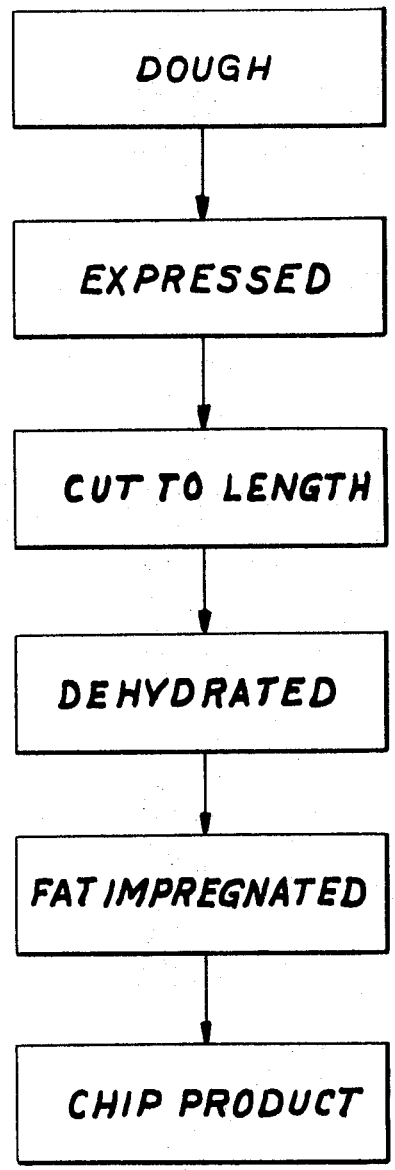

FIG. 3 is a schematic representation of one way of practicing the process of the present invention; and FIG. 4 is a view of a few representative elongated edible chips of larger size, that simulate whole fried bacon strips in flavor, texture, and appearance and that are made in accordance with another embodiment of the present invention. The latter is exactly the same as that shown in FIG. 3 except that two different doughs, one colored reddish-brown and the other a light tan in color, are simultaneously expressed without intimate admixture.

Figure 1:
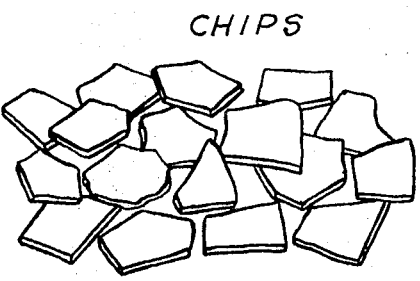
FIG. 1 is a view of a few representative edible chips of one type, made in accordance with one embodiment of the present invention.

We have now discovered that crisp, flavored chips, such as are illustrated in FIGS. 1 and 4 may be economically produced by the dehydration, at from about 275° F. to about 425° F., of a flaked dough prepared from particulate farinaceous material, fat, salt, flavoring, water and color. The dough is expressed into ribbon-like form by an extruder or between rolls, flaked, and then dehydrated as by baking or frying. The chips thus produced are crisp, flavorful, and can be eaten in the same ways as fried bacon, viz. in sandwiches, as snack items or can be incorporated in other foods such as in peanut butter or in cooked eggs. However, preferably, the chips are impregnated with fat, for further taste appeal, and to avoid later take-up of fat in case the chips are mixed into a food such as peanut butter. Flavorings may be incorporated in this fat used for impregnating purposes provided the fat is applied to the product after cooking. Throughout the present specification and appended claims, reference is made to "chips." By "chips" we refer to the units of the crisp products prepared in accordance with the present invention with reference to composition and processing. These chips may be small flakes, flat or curled, or may be elongated strips of variable length, width and thickness, and such strips may be flat or curled. When the chips are in the form of small flakes they should be preferably of uniform color simulating the lean portion of fried bacon. When the chips are in the form of elongated strips they are preferably colored to simulate the appearance of crisp fried bacon.

In making chips in accordance with the invention, a wide variety of farinaceous materials may be employed in preparing the dough. Generally speaking, vegetable, cereal, and potato flours can be used, and some starch may be incorporated in the flours. Among the varieties of flour that can be employed are the flours of rice, wheat, either white or whole wheat, tapioca, potato, and corn flour.

Oat flour may also be used to provide a substantial portion of the farinaceous material, but should not comprise the entire amount. Oat flour generally requires the presence of some extra starchy material as a binder, otherwise the chips produced tend to be somewhat crumbly. Defatted soy flour may also be used for a portion of the farinaceous material. Defatted soy flour is so high in protein that chips containing the higher amounts of soy flour tend to be quite firm and brittle. Defatted peanut flour can be employed for a portion of the farinaceous material in the dough.

A preferred particulate farinaceous material is a mixture of wheat flour and toasted oat flour, such as, for example, a mixture of 80% cake flour and 20% toasted oat flour.

It is highly desirable to incorporate what may be regarded as a texturing agent or filler in the dough. Toasted oat flour, up to about 20% by weight of the dough, serves this function. It provides a softening influence on the final product. Other types of protein of low adhesive strength could be used for the same purpose.

The fat for the dough may constitute up to 25% by weight of the dough, preferably from about 1.5% to about 20%. The fat must be stable to oxidation and hydrolysis, so that the chip product is characterized by good shelf life. The preferred fat is one derived from vegetable sources and is most desirable seed oil; in either case, the oil contains not more than 5% linoleic acid, because of being naturally low in linoleic acid or brought to this level by hydrogenation.

The fat content has a direct effect on the texture of the chip product. Generally speaking, as the fat content of the chip increases, the chip tends to become less dense, less brittle, and more easily fractured. Oat flour produces the same kind of effect. To a limited extent, therefore, oat flour and fat are mutually substitutable one for the other.

The amount of salt in the product has a direct effect upon the flavor of the chip. The amount of salt used should be coordinated with the strength and kind of flavoring in the chip. Ordinarily, the amount of salt in the chip, on a dry basis, should be from about 6% to about 15% by weight of the chip, and preferably, in a range from about 6% to about 12% by weight of the chip.

The flavoring material employed may be any one of several commercially available bacon, smoky bacon, or any other desired flavoring materials. For chips that are to be used in peanut butter, a smoky flavor is highly desirable in order to bring out the bacon flavor of the chips. One suitable commercial flavoring material is known to be a hydrolyzed plant protein material, with added artificial smoke flavor. The coloring may be any generally accepted food coloring material, to produce a desired chip appearance, such as, for example, the reddish-brown appearance that is characteristic of the lean proteins of fried bacon.

The water content of the dough has a critical effect upon the chewability of the chip product. The more water in the dough, the more the chip product resembles a soda cracker. An amount of water up to about 25%, added to the other ingredients, by weight of the dough thus produced, is generally satisfactory. Preferably, just enough water should be used so that the dough is moist enough to hold its shape upon extrusion or rolling. A water content of 14% by weight of the dough has given satisfactory results.

Figure 2:
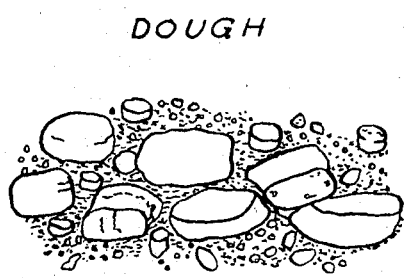
FIG. 2 is a view of a small, representative sample of a typical dough used in the production of chips of all types and of different colors, in accordance with the invention.

A dough that is produced in accordance with the invention by thorough admixture of the fine, particulate farinaceous material, fat, salt, flavoring, water with or without added color, ordinarily takes the form shown by way of example in FIG. 2.

The ribbon-like product of the expressed dough or doughs is then cut into flakes or elongated strips of desirable size. Although the flaking process can follow the cooking and dehydration step, it is much more difficult to cut the material into flakes of uniform size after final dehydration. The dough or doughs consist of discrete particles and agglomerates that vary in size. The doughs are not like a bread dough, and lack cohesiveness.

To make chips having no color or a single uniform color, the dough is expressed into a ribbon-like form either by passage through an extruder or by passage through pressure rolls. To make large, elongated, simulated bacon strips, of the kind shown for example in FIG. 4, two different doughs are prepared. The first is colored, preferably reddish-brown, like the lean portion of cooked bacon. The second dough is either uncolored or slightly tan colored. These two different doughs are simply fed simultaneously into an extruder, or other machinery, to obtain a streaked ribbon-like product as in FIG. 4.

The flakes or strips are accumulated in a deep bed and then are baked at about 325° F. for about 10 minutes. The purpose of dehydrating the flakes or strips in a deep bed is to permit a practical dehydration rate. As the dehydration is practiced on a commercial scale, it is preferred to overheat a single layer of discrete flakes or strips for a very short period of time, initially, to dehydrate them at about 10 times the normal rate, and then to continue their dehydration in a deep bed for an additional subsequent period at the normal rate. The initial fast dehydration accomplishes what can be considered to be case hardening, to strengthen each discrete article so that it will retain its shape during subsequent cooking and dehydration without sticking. This case hardening is usually required and is preferred when making the elongated chips which simulate strips of bacon. When chips of small flake size are produced, these are preferably dried immediately in a deep bed of a fluid bed cooker and dehydrator.

Baking at 325° F. for about 10 minutes provides quite satisfactory results for the dehydration of batches. For operation on a continuous commercial scale, the use of a tunnel dehydrator is preferred, with an initial, superheated chamber for the initial fast drying step. Generally, drying temperatures from about 175° F. to about 425° F. are quite satisfactory. When a fluid bed cooker and dehydrator is employed in making the chips of small flake size, the baking time at 400° F. is greatly reduced to less than about 2 minutes.

The chips obtained after final dehydration should have a thickness of from about 0.5 mm. to 3.0 mm., and preferably, the thickness should not exceed 2 mm. These chips may be either flat or curled. The surface dimensions of a given chip need not be more than about 2.5 cm. by about 10 cm. to simulate a strip of fried bacon. For use of this product in spreads such as peanut butter, it is preferred that the surface dimensions of the chip be about 1 cm. to about 2 cm. on each side. Although the largest dimension of a given chip, that is intended for condiment use, can be as high as one inch for some of the applications, for most applications, it is preferred that the maximum dimension of the chip be not more than one-half inch. Since the chips are ordinarily not aerated or leavened, the chip thickness is not greatly different from the thickness of the expressed dough. The chips may be used directly following cooking and dehydration.

The preferred chips of this invention are sprayed with or are dipped in an edible oil. For use in foods having high fat contents, such as peanut butter, the chips are desirably impregnated with the oil. The final impregnating fat or oil, with or without added flavor, can be any desired stable material. One satisfactory material, for example, is hydrogenated coconut oil with or without other stable fats of good eating quality (melting points less than 115° F.). A spray with a laurin-myristin type fat has been found to be quite satisfactory. A pickup of about 15% of fat by weight of the chip product gives good results where the chips are to be incorporated in peanut butter or used for direct consumption as snacks. The fat adds its own texture and also enhances the flavor and color appeal of the chip. Moreover, when the fat-impregnated chips are mixed with peanut butter, there is either a reduced tendency or no tendency for the chips to draw oil from the peanut butter.

When the expressed dough or doughs are cut to length and fried in deep fat rather than baked, a sufficient amount of oil is absorbed from the frying fat so that additional impregnation is not necessary. Obviously, therefore, the frying fat must be a stable material of acceptable flavor characteristics such as a hydrogenated vegetable seed oil with less than 5% residual linoleic acid. Frying times are shorter than baking times.

In preparing the dough, small amounts of sugar can be added, if desired. To enhance the protein content, milk powder can be added to the dough in moderate amounts. If a nut butter, such as peanut butter, is used in the dough, it supplies both farinaceous material and fat, since it can be considered an approximately 50/50 mixture of peanut flour and penut oil.

The fat component of the dough may be partially hydrogenated cottonseed oil of about 55 to 65 iodine value, a partially hydrogenated soybean oil of 60 to 70 iodine value, or a peanut oil that has been partially hydrogenated to an iodine number of about 55, selective conditions of hydrogenation being preferably used.

When a laurin-myristin type fat is used in the dough formulation, special precautions must be taken to prevent hydrolysis of the laurin-myristin fats, such as reducing the temperature and/or the time of baking.

The following table describes and summarizes the composition of chips made in accordance with the present invention.

COMPOSITION OF CHIPS

| Component | Percent by weight | |
|---|---|---|
| | Typical range | Representative analysis |
| Water | <3, preferably <1 | 1 |
| Fat (including fat applied to the cooked chips) | 5 to 40, preferably 15 to 35 | 28 |
| Protein | Up to 10 | 8 |
| Salt | 5–15 | 12 |
| Ash | About 3 | 3 |
| Carbohydrate | Balance | About 48 |
| Flavoring and color | | |

The bulk density (ratio of weight to volume of chips in a cylinder having a diameter of 4 centimeters) of the chips made in accordance with this invention is on the order of about 0.4. For this measurement, flat chips of about 1 mm. in thickness and about 1 cm. on each side are used. Chips made in accordance with this invention are therefore lower in bulk density than chips of lean fried bacon. Accordingly, when a peanut butter preparation is made up that incorporates chips to the extent of 9% by weight, which is a common level of addition, more chips by volume must be incorporated in the peanut butter in accordance with the present invention than is the case with real bacon. This means that by using chips made in accordance with the pres- ture effects can be obtained from peanut butter mixtures, at the same weight level of addition.

An example of the practice of the present invention follows.

EXAMPLE 1

A dough was prepared from the following ingredients, as listed in Table 1.

TABLE 1

| Ingredient: | Percent by weight |
|---|---|
| All purpose cake flour | 40.64 |
| Pulverized H-O Quick Oats (Best Foods Div., Corn Products Co.) | 11.40 |
| Salt | 7.50 |
| Hydrolyzed plant protein | 3.97 |
| Hydrogenated cottonseed oil (102° F. M.P.; 63 I.V.) | 13.94 |
| Flavor | 3.22 |
| Water | 19.30 |
| Coloring (F.D. & C. Certified) | .03 |

The flavor material was an imitation bacon flavor that was purchased from a commercial producer.

The dough was prepared from these ingredients in the following manner. All of the dry ingredients, except the food coloring, were mixed together in a planetary mixer. The shortening was then melted and added to the other ingredients. Blending was continued for a few minutes to obtain a crumbly mass with fairly uniform distribution of the shortening.

The coloring and water were then added to the mixer, and blended with the other ingredients, to produce a dough rolled to a thickness of about 1 mm., hand cut into squares of about 1 cm. on each side, and oven baked for about 10 minutes at about 325° F.

After impregnating the baked chips by dipping in a blend (M.P. of 110° F.) of hydrogenated coconut oil and hydrogenated soybean oil, the chip analysis was found to be approximately 28% fat, 12% salt, and less than 1% water, by weight. The chips were delicious when eaten directly, as snack items, or when eaten in combination with other foods such as peanut butter or scrambled eggs.

EXAMPLE 2

A dough was prepared from the following ingredients, as listed in Table 2.

TABLE 2

| Ingredient: | Percent by weight |
|---|---|
| All purpose cake flour | 34.85 |
| Vital wheat gluten | 8.59 |
| Pulverized H-O Quick Oats (Best Foods Div., Corn Products Co.) | 12.18 |
| Salt | 8.02 |
| Hydrolyzed plant protein | 4.24 |
| Hydrogenated cottonseed oil (102° F. M.P.; 63 I.V.) | 14.90 |
| Flavor | 3.44 |
| Water | 13.75 |
| Coloring (F.D. & C. Certified) | 0.03 |

The dough was prepared in a manner as outlined in Example 1. The dough was extruded through the die plate of a food press. The die plate was formed with a plurality of slits, each approximately 0.375 inch by 0.020 inch. The ribbons of dough thus produced were cut to roughly square shape by a knife.

These chips were baked and then impregnated with the same vegetable oil blend as in Example 1. Their taste and texture were excellent.

EXAMPLE 3

A dough was prepared according to the formula and procedure given in Example 2. The dough squares, upon extrusion through the die plate of the food press, were distributed on a platform in a single layer, separated one from the other. These dough squares were then exposed for case hardening to a temperature of 425° F. for a one minute period. They were then transferred to a heating chamber maintained at 325° F., where the chips were now stacked in depth one on top of each other. The cooking and dehydration was accomplished within nine minutes with the result that the final chips remained separated one from the other and free flowing.

EXAMPLE 4

The product of Example 3 was prepared by cooking the dough squares in a fluid bed cooking and dehydrating unit (the Jetzone Unit, manufactured by the Wolverine Corporation, Cambridge, Mass.). With this unit, the dough squares were handled without prior case hardening in an expanded layer of about 6 to 8 inches in depth; temperature was 400° F.; processing time was one minute. Chips of excellent crispness, flavor and color, simulating chips of fried lean bacon were obtained.

EXAMPLE 5

A dough prepared from the following ingredients, as listed in Table 3.

TABLE 3

| Ingredient: | Percent by weight |
| --- | --- |
| All purpose cake flour | 34.09 |
| Pulverized H-O Quick Oats (Best Foods Div., Corn Products Co.) | 20.09 |
| Monosodium glutamate | 2.35 |
| Salt | 5.89 |
| Sugar | 7.06 |
| Hydrogenated soybean oil (112° F. M.P.; 67 I.V.) | 1.65 |
| Flavor | 2.94 |
| Water | 25.90 |
| Coloring (F.D. & C. Certified) | .03 |

The dough was prepared according to the procedure given in Example 2. The dough squares, upon extrusion through the die plate of the food press, were deep fat fried in shortening (the same as the fat component in the dough) heated to 350° F. This cooking and dehydration step was accomplished in about 2 minutes. At the termination of the frying operation, the crisps were drained of excess fat.

This is a less preferred example of the chips of the present invention for the following reasons:

(1) The frying oils absorbed into the chips undergo greater heat abuse than the oil incorporated in the dough during baking or during subsequent oil impregnation.

(2) The eating quality of the fried chip is not quite as acceptable as that of the baked chip since the fried chip has, to some critical evaluators, a slight soapy taste. This might be due to some hydrolysis of the fat during the frying of dough squares of the unusual composition herein described.

EXAMPLE 6

The product of Example 2 was added to peanut butter in the following proportions:

| | Percent |
| --- | --- |
| Peanut butter | 91 |
| Chips | 9 |
| Flavor (bacon, smoke) | trace. |

This product has eating qualities of a food consisting of peanut butter with chips of fried lean bacon dispersed therein. However, our product is superior since the degree of crispness of the chips contained therein as well as flavor and chip size, are more uniform. Furthermore, the chips of our invention simulate only the desired portion of fried bacon, namely the lean red meat.

EXAMPLE 7

The product of Example 2 was added to scrambled eggs, as follows:

To one egg there was added one tablespoon of milk. The mixture was scrambled and fried. Just prior to turning the egg, one tablespoon of the chips of Example 2 was added. The frying was then continued to the desired degree.

The end result is a scrambled egg containing crisp, bacon-like chips which simulate the eating qualities of fried lean bacon pieces. The resultant food is superior to one prepared with real bacon for the reasons stated in Example 5.

EXAMPLE 8

Two separate doughs were prepared, a first identical to that given in Table 2 found in Example 2, and a second identical to the first but with no coloring material included in its formulation. The two doughs were prepared in a manner as outlined in Example 1. These two dough formulations, identical to each other in physical characteristics, differing only in color, were fed in alternating fashion into a food press equipped with a die plate (Mafalde type) designed to produce ribbons of dough about 1.6 cm. wide and 1 mm. thick with rippled edges on both sides. The ribbons of raw dough were cut at lengths of about 8 cm.

These chips were baked for about 10 minutes at about 325° F. and then were impregnated with the same vegetable oil blend as in Example 1. The resulting crisp food article had the appearance of strips of fried bacon. They were crisp, had curls and ripples and showed distinct reddish-brown and light tan bands running parallel to the length of the strip. The physical appearance of these duo-colored chips strongly resembled fried bacon containing both lean and fatty portions. Their taste and texture were also excellent. When added on top of fried eggs or to a lettuce and tomato sandwich, these crisps imparted all the organoleptic properties of fried bacon to the composite foods.

EXAMPLE 9

Ribbons of two dough formulations were prepared in a manner as outlined in Example 8. The raw dough ribbons were heat processed as elongated chips according to the method described in Example 3; the latter involves preliminary case hardening. This procedure also gave a highly acceptable product when eaten as such or along with other foods.

Advantages

Among other advantages, it may be pointed out that the present invention provides quite unexpected results because the chips have the taste and texture of fried bacon, without the use of protein as a major component in the base. Other advantages of the present invention include a low cost of production as compared to textured soy protein products, ease of manufacture, greater uniformity than textured soy protein products, particularly with respect to texture, quality, and flavor, and very good mouthing characteristics. In addition, the chips themselves have strong taste appeal and are excellent flavor carriers.

One of the unexpected features of the invention is that the chips are produced from a dough without any appreciable volume increase or puffing in the chips as compared with the expressed, flaked dough. This is thought to be due to the loose texture of the dough, produced in accordance with the invention, permitting the escape of water vapor during cooking and dehydration. One of the amazing aspects of the present invention is that the preferred chips, made through the simpler baking operation with the final oil impregnation, have the appearance and eating qualities expected of chips fried in oil.

Chips can be made in accordance with this invention to have flavor, crunchy texture, and visual appeal similar to those of small pieces of the lean portion of fried, smoke-cured bacon or of strips simulating, in all organoleptic properties, conventional fried bacon. In addition to forming desirable mixtures with scrambled eggs, peanut butter and peanut butter products, the chips can be sprinkled on or added to other foods to enhance their appeal. For example, the chips can be incorporated in soups, dips, sauces, salad mixes, and can be sprinkled on casseroles. They are a highly appealing addition to sandwich spreads of all kinds. They can be incorporated in doughs used in making other products, such as, for example, crackers, specialty breads, and rolls. They are also appealing when added to such diverse food items as cooked eggs of all types, cottage cheese, baked beans, cheese loaves, potato salads, dressings and dressing mixes. The products simulating strips of fried bacon can be used wherever conventional fried bacon is used.

While the invention has been described in connection with specific embodiments thereof, it will be understood that it is capable of further modification, and this application is intended to cover any variations, uses, or adaptations if the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

We claim:

1. An edible, crisp, bacon-like flavored chip containing from about 5% to about 15% salt by weight and having been dehydrated, by cooking at a temperature of from about 275° F. to about 425° F. for a period of time sufficient to form a crisp product, from a dough consisting essentially of: fine particulate farinaceous material provided by a mixture of a major amount of wheat flour and a minor amount, up to about 20% by weight, of a texturizing agent; from about 1.5% to about 20% by weight of the dough of a vegetable seed oil; salt; a flavoring agent capable of imparting a bacon-like flavor to the chip; and water in an amount up to about 25% by weight of the dough.

2. An edible, crisp, bacon-like flavored chip of claim 1 having a thickness of from about 0.5 mm. to about 2 mm. and about 1 cm. to about 2 cm. on each side, said chip containing from about 5% to about 15% salt by weight, and having been dehydrated, by cooking at a temperature of from about 275° F. to about 425° F. for a period of time sufficient to form a crisp product, from a dough consisting essentially of: fine particulate farinaceous material provided by a mixture of about 80% wheat flour and about 20% toasted oat flour by weight; from about 1.5% to about 20% by weight of the dough of a vegetable seed oil that has been hydrogenated to contain not more than 5% residual linoleic acid; salt; a flavoring agent capable of imparting a bacon-like flavor to the chip; and water in an amount up to about 25% by weight of the dough, and said chip being substantially the same in volume as the chip in the dough stage.

3. An edible, crisp, bacon-like flavored curled chip of claim 1 having a thickness from about 0.5 mm. to about 2 mm. having a width of up to about 2.5 cm. and a length of up to about 10 cm., said chip showing distinct reddish brown and light tan bands running parallel to the length of the chip and said chip containing from about 5% to about 15% salt by weight and having been dehydrated, by cooking for a period of time sufficient to form a crisp product at a temperature of from about 275° F. to about 425° F., from a dough consisting essentially of: fine particulate farinaceous material provided by a mixture of about 80% wheat flour and about 20% toasted oat flour by weight; from about 1.5% to about 20% by weight of the dough of a vegetable seed oil that has been hydrogenated to contain not more than 5% residual linoleic acid; salt; a flavoring agent capable of imparting a bacon-like flavor to the chip; color; and water in an amount up to about 25% by weight of the dough and said chip being substantially the same in volume as the chips in the dough stage.

4. An edible chip in accordance with claim 1, wherein the flavoring agent imparts a smokey taste to the chip.

5. An edible, crisp, bacon-like flavored chip of claim 1 having been dehydrated by first case hardening the dough by fast dehydration, and thereafter cooking the flakes at a temperature from about 275° F. to about 435 F.

6. A foodstuff containing the crisp, edible chips as described in claim 1 distributed throughout a food matrix.

7. A foodstuff comprising a ground peanut matrix and crisp, edible chips as described in claim 1, distributed throughout the matrix.

References Cited

UNITED STATES PATENTS

| | | | |
|---|---|---|---|
| 1,926,347 | 9/1933 | Morrow | 99—81 |
| 2,882,162 | 4/1959 | Holahan | 99—80 |
| 2,905,559 | 9/1959 | Anderson et al. | 99—80 |
| 3,027,258 | 3/1962 | Markakis et al. | 99—81 |
| 3,076,711 | 2/1963 | Gerkens | 99—80X |
| 3,348,950 | 10/1967 | Weiss | 99—80 |
| 3,320,070 | 5/1967 | Hartman | 99—17 |
| 3,332,781 | 7/1967 | Benson et al. | 99—81 |

OTHER REFERENCES

Food Engineering, January 1966, page 15, article entitled "Peanut Butter and Bacon Sandwich Spread."

RAYMOND N. JONES, Primary Examiner

U.S. Cl. X.R.

99—1, 113, 128